United States Patent [19]

Miyahara et al.

[11] Patent Number: 5,800,745
[45] Date of Patent: Sep. 1, 1998

[54] OIL HOLDING CYLINDER FOR AN OIL COATING ROLLER AND METHOD THEREFOR

[75] Inventors: Yoshihisa Miyahara; Kouichi Kimura, both of Yokohama; Yoshiyuki Motoyoshi, Kawasaki; Tatsuo Takagi, Yokohama; Osamu Horiuchi, Kawasaki; Hiromi Furuya, Kuroiso, all of Japan

[73] Assignees: Nichias Corporation, Tokyo; Zenith Corporation, Kuroiso, both of Japan

[21] Appl. No.: 633,531

[22] Filed: Apr. 17, 1996

Related U.S. Application Data

[62] Division of Ser. No. 366,117, Dec. 29, 1994.

[30] Foreign Application Priority Data

Dec. 29, 1993 [JP] Japan ................ 5-349748

[51] Int. Cl.⁶ .................................. B29B 7/00
[52] U.S. Cl. .................... 264/13; 264/14; 264/464; 264/477; 264/603; 264/605; 264/639
[58] Field of Search ..................... 264/13, 14, 464, 264/477, 603, 605, 639, 2

[56] References Cited

U.S. PATENT DOCUMENTS

| | | | |
|---|---|---|---|
| 3,812,782 | 5/1974 | Funahashi | 492/59 X |
| 3,852,862 | 12/1974 | Sukenik | 492/50 |
| 4,608,361 | 8/1986 | Kanamori et al. | 502/232 |
| 4,746,287 | 5/1988 | Lannutti | 431/328 |
| 4,757,347 | 7/1988 | Tamaoki et al. | 355/284 |
| 4,887,340 | 12/1989 | Kato et al. | 492/56 X |
| 5,468,531 | 11/1995 | Kikukawa | 492/56 X |

FOREIGN PATENT DOCUMENTS

| | | |
|---|---|---|
| 1071291 | 2/1980 | Canada ................ 355/284 |
| 34 33 315 | 3/1986 | Germany . |
| 41 05 674 | 8/1992 | Germany . |
| 59-73762 | 5/1984 | Japan . |
| 60-136782 | 7/1985 | Japan . |
| 60-247276 | 12/1985 | Japan . |
| 61-6381 | 2/1986 | Japan . |
| 63-37369 | 2/1988 | Japan . |
| 1-32985 | 7/1989 | Japan . |
| 1 401 231 | 7/1975 | United Kingdom . |

OTHER PUBLICATIONS

Database WPI, Section Ch, Week 8946, Derwent Publications Ltd., London, GB; Class A81, AN 89-337133 XP002015470 & JP-A-01 252 588 (Matsushita Elec Ind KK), Oct. 9, 1989.

Database WPI, Section Ch, Week 9015, Derwent Publications Ltd., London, GB; Class H06, AN 90-112549 XP002015471 & JP-A-02 064 073 (Matsushita Elec Ind KK), Mar. 5, 1990.

*Primary Examiner*—Richard Weisberger
*Attorney, Agent, or Firm*—Cushman Darby & Cushman IP Group of Pillsbury Madison & Sutro, LLP

[57] ABSTRACT

To provide an oil supplying means for an oil coating roller, by which oil can be supplied stably for a long time while preventing offset, a cylindrical non-sintered molded body which is a mixture of ceramic fiber and clay is used as an oil holding member in an oil coating roller.

3 Claims, 1 Drawing Sheet

FIGURE
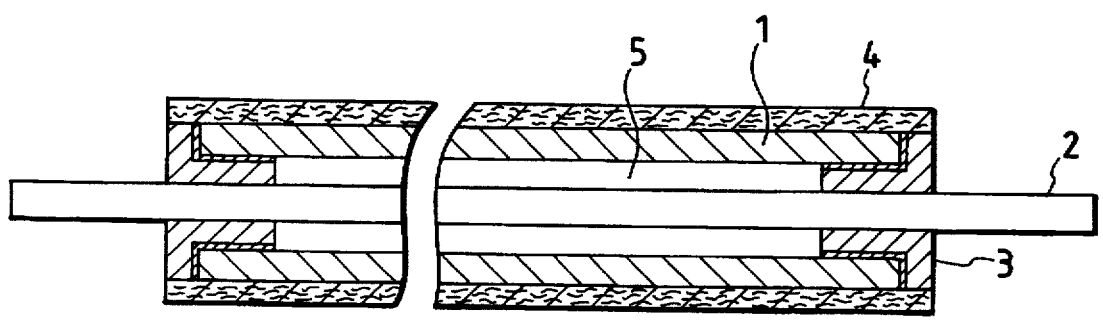

OIL HOLDING CYLINDER FOR AN OIL COATING ROLLER AND METHOD THEREFOR

This Is a division of application Ser. No. 08/366,117 filed Dec. 29, 1994, pending.

BACKGROUND OF THE INVENTION

The present invention relates to an oil holding cylinder for use in an oil coating roller of a fixing device employed in an electrostatic copying machine, an electrophotographic printer, or the like.

Most of fixing devices employed in electrostatic copying machines, electrophotographic printers and so on have parts called oil coating rollers. When rotating in contact with a fixing roller, this oil coating roller applies a very small amount of silicone oil to the fixing roller so as to improve the separation property of a recording paper. In addition, at the same time, the oil coating roller wipes up toner adhering to the fixing roller so as to prevent offset from occurring.

In some cases silicone oil, with which a fixing roller is coated by means of an oil coating roller, is supplied successively to the oil coating roller from an oil reservoir member provided separately. However, it is an ordinary case where a constant amount of silicone oil is held in an oil coating roller itself, and the whole of the oil coating roller is exchanged when the oil held therein has been used up.

Although there are various mechanisms for holding silicone oil in an oil coating roller, that which can hold enough oil to enable the oil coating roller to be used for a long time is a system in which a core shaft of an oil coating roller is made oil-permeable and hollow and silicone oil is enclosed or charged in the hollow portion. In this system, the enclosed oil is exuded onto the surface of the hollow core shaft gradually, and the exuded oil is distributed, by capillary action, over an oil coating roller surface layer made from felt of heat-resistant fiber. As the oil-permeable hollow core shaft, that which is provided with a number of small-diameter holes in a metal pipe (see JP-U-59-73762, JP-U-60-110854, JP-A-60-136782), that which is made of porous sintered metal (see JP-A-60-247276), and so on have been used.

An oil coating roller using such a conventional oil-permeable hollow core shaft has been disadvantageous in that the quantity of coating oil varies largely in use of the oil coating roller, and that the quantity of coating oil is excessive to thereby stain a recording paper with oil particularly when the oil coating roller is operated again after the oil coating roller has not been used for a long time.

SUMMARY OF THE INVENTION

The present invention is intended to solve the foregoing problems in a conventional oil coating roller using a hollow core shaft, and an object of the invention is to provide an oil supplying means for an oil coating roller in which oil can be supplied stably for a long time.

According to the present invention, there is provided an oil holding cylinder for an oil coating roller, which includes a cylindrical non-sintered molded body which is a mixture of ceramic fiber and organic binder or a mixture of ceramic fiber inorganic binder and organic binder, instead of a conventional hollow core shaft, as an oil holding means for an oil coating roller.

An oil holding cylinder according to the present invention is used in a state that it is attached to a driving shaft of an oil coating roller so as to cover the driving shaft coaxially. The oil holding cylinder is used in combination with the driving shaft in a manner that the inner diameter of the oil holding cylinder is sufficiently larger than the diameter of the driving shaft to thereby form a space between the inner circumferential surface of the oil holding cylinder and the outer surface of the driving shaft when the oil holding cylinder is attached to the driving shaft. The opposite ends of the oil holding cylinder are enclosed by enclosing means which acts also as fittings to the driving shaft, and silicone oil is enclosed or changed in the space formed between the oil holding cylinder and the driving shaft. Synthetic resin foamed material, felt, or the like having pores communicating with each other may be stuffed together with the oil so as to prevent the enclosed oil from flowing. A surface layer having a desired structure and made of desired material such as felt of heat-resistant fiber is fixed to the surface of the oil holding cylinder in the same manner as the surface layer of a conventional oil coating roller.

The oil holding cylinder according to the present invention constituted by a non-sintered molded body, which is a mixture of ceramic fiber and organic binder or a mixture of ceramic fiber inorganic binder and organic binder, is a fine molded body apparently, but contains in the cylinder wall a plenty of pores communicating with each other and distributed between ceramic fibers. Therefore, this oil holding cylinder has a property to allow oil to permeate the oil holding cylinder. Accordingly, in an oil coating roller constructed in the above-mentioned manner by using this oil holding cylinder, the enclosed silicone oil permeates the wall of the oil holding cylinder gradually to be supplied to the surface layer.

The above-mentioned pores are formed inevitably after water is evaporated in the process where clay and water are added to ceramic fiber, then mixed, molded, dried and solidified. The porosity is almost proportional to the content of rigid ceramic fiber, so that the porosity is larger as the ratio of the ceramic fiber is higher. The distribution of the pores can be therefore adjusted easily by changing the ratio of the ceramic fiber to the clay to thereby obtain an oil holding cylinder having a desired oil-permeability.

An oil holding cylinder having an oil-permeability suitable to most cases has porosity in a range of from about 30 to 70% (wherein porosity=[1-bulk specific gravity/true specific gravity]×100).

Next, a method of producing an oil holding cylinder according to the present invention will now be described.

As for the raw ceramic fiber material, aluminosilicate fiber, alumina fiber, or the like may be used, and as for the raw clay, ball clay, kaolinite, bentonite, or the like, may be used. Of course, it is preferable to use ceramic fiber as high in quality as possible and clay as uniform in grain size as possible in order to obtain a product having pores which are uniform in size and distribution.

Since it is difficult to produce a cylindrical molded body having physical properties required as an oil holding cylinder by only ceramic fiber and clay, an inorganic binder and an organic binder is mixed into the ceramic fiber and clay suitably. As for the suitable inorganic binder, for example, colloidal silica, alumina sol, or the like may be used, and as for the suitable organic binder, methyl cellulose, carboxymethyl cellulose, or the like may be used. A typical composition of the raw materials is as follows.

| | |
|---|---|
| ceramic fiber | 45 to 60 weight % |
| clay | 10 to 30 weight % |
| inorganic binder | 7 to 10 weight % |
| organic binder | 18 to 24 weight % |
| water | 60 to 100 parts of weight per 100 parts of weight of the sum of the above raw materials |

It is preferable that the fiber be about 0.1 to 20 mm long, and its diameter be in the range of about 1 to 5μm.

Those raw materials are mixed enough, and the obtained plastic mixture is extrusion-molded into a cylinder. It is preferable to make the wall thickness of the cylinder be about 2 to 5 mm. Next, the cylinder is dried under ordinary temperature or by heating. Before or after the drying, the cylinder is cut off into a desired length corresponding to the length of an oil coating roller to obtain an oil holding cylinder according to the present invention.

As described above, since a product has high porosity and good oil-permeability if the ratio of ceramic fiber is made large, the composition of the raw materials is adjusted in accordance with required oil-permeability. Although the strength of the product is more increased, the more inorganic binder, and the porosity is reduced similarly to the case where the content (ratio) of clay is increased. Accordingly, the inorganic bonding agent must not be used excessively.

BRIEF DESCRIPTION OF THE DRAWING

FIG. 1 is a sectional view illustrating an embodiment of an oil coating roller using an oil holding cylinder according to an embodiment of the present invention.

DESCRIPTION OF THE PREFERRED EMBODIMENTS

Inventive Example 1

Water of 58 parts by weight was mixed and kneaded into a mixture consisting of aluminosilicate ceramic fiber of 100 parts by weight, and carboxymethyl cellulose of 58 parts by weight. The thus prepared plastic mixture was extrusion-molded and dried to thereby obtain an oil holding cylinder having an inner diameter of 16 mm, an outer diameter of 24 mm and a length of 300 mm.

The bulk specific gravity, the bending strength, and the porosity of this oil holding cylinder were 0.85, 120 kgf/cm$^2$, and 60% respectively.

As shown in FIG. 1, the above-mentioned oil holding cylinder 1 was attached by means of an annular fitting 3 to a driving shaft 2 having a diameter of 8 mm. Felt 4 made from alamide heat-resistant fiber was wound on the outer circumferential surface of the oil holding cylinder 1 as a surface layer of an oil coating roller. Silicone oil (having viscosity of 1,000 cp) was enclosed or charged up to 70% of a space 5 surrounded by the oil holding cylinder 1, the driving shaft 2 and the fitting 3.

The oil ejection characteristic of the above-described oil coating roller was examined. The examination was performed in such a manner that the oil coating roller was put into a drier of 200° C. and heated for 6 hours, the increase of weight of the heat-resistant fiber felt 4 caused by the permeation of silicone oil was measured at intervals of one hour so as to obtain the quantity of the silicone oil which permeated from the oil holding cylinder 1. After the oil coating roller was left for 18 hours thereafter, the above-mention heating examination was repeated.

As a result, in each cycle the quantity of permeating oil was 5 g/H upon the lapse of one hour after starting heating, and thereafter decreased gradually to about 1 g/H. This oil ejection characteristic was satisfactory as the characteristic of an oil coating roller for use in a general fixing means.

Inventive Example 2

Water of 65 parts by weight was mixed and kneaded into a mixture of 100 parts by weight consisting of aluminosilicate ceramic fiber of 46% by weight, ball clay of 28% by weight, colloidal silica of 7.5% by weight (as solid), and carboxymethyl cellulose of 18.5% by weight. The thus prepared plastic mixture was extrusion-molded and dried to thereby obtain an oil holding cylinder having an inner diameter of 16 mm, an outer diameter of 24 mm and a length of 300 mm.

The bulk specific gravity, the bending strength, and the porosity of this oil holding cylinder were 1.39, 324.4 kgf/cm$^2$, and 38.4% respectively.

As shown in FIG. 1, the above-mentioned oil holding cylinder 1 was attached by means of an annular fitting 3 to a driving shaft 2 having a diameter of 8 mm. Felt 4 made from alamide heat-resistant fiber was wound on the outer circumferential surface of the oil holding cylinder 1 as a surface layer of an oil coating roller. Silicone oil (having viscosity of 300 cp) was enclosed or charged up to 70% of a space 5 surrounded by the oil holding cylinder 1, the driving shaft 2 and the fitting 3.

The oil ejection characteristic of the above-described oil coating roller was examined. The examination was performed in such a manner that the oil coating roller was put into a drier of 200° C. and heated for 6 hours, the increase of weight of the heat-resistant fiber felt 4 caused by the permeation of silicone oil was measured at intervals of one hour so as to obtain the quantity of the silicone oil which permeated from the oil holding cylinder 1. After the oil coating roller was left for 18 hours thereafter, the above-mention heating examination was repeated.

As a result, in each cycle the quantity of permeating oil was 4 g/H upon the lapse of one hour after starting heating, and thereafter decreased gradually to about 1 g/H. This oil ejection characteristic was satisfactory as the characteristic of an oil coating roller for use in a general fixing means.

Inventive Example 3

An oil holding cylinder was produced in the same manner as in the Inventive Example 2 except that the quantity of mixed ball clay was set to 2/3.

The bulk specific gravity of this oil holding cylinder was 1.29, the bending strength was 290.7 kgf/cm$^2$, and the porosity was 42.4%.

In the same way as in Example 2, the quantity of permeating was inspected. In each cycle, the quantity was 6 g/H upon the lapse of one hour after starting heating, and thereafter decreased gradually to about 1 g/H. This oil ejection characteristic was satisfactory as the characteristic of an oil coating roller for use in a general fixing means.

The oil holding cylinder according to the present invention constituted by the cylindrical non-sintered molded body which is the mixture of ceramic fiber and clay shows an extremely stable oil-permeable performance for a long time, and the characteristic can be changed easily by adjusting the composition of raw materials. Accordingly, by using this feature, it is possible to produce an oil coating roller which can be adapted to various fixing means and can be used for a long time.

What is claimed is:

1. A method for producing an oil holding cylinder for an oil coating roller, composing the following steps of:

mixing organic binder of 30 to 50wt % with respect to ceramic fiber with a predetermined amount of water to form plastic mixture;

extruding the plastic mixture into a cylinder; and after said extruding, drying said cylinder.

2. A method for producing an oil holding cylinder for an oil coating roller, comprising the following steps of:

kneading a mixture of 100 parts by weight composed of ceramic fiber of 30 to 80 wt %, clay of 1 to 50 wt %, inorganic binder 2 to 15 wt % and organic binder 12 to 32 wt % with water of 20 to 100 parts by weight to form a plastic mixture;

extruding the plastic mixture into a cylinder; and after said extruding, drying said cylinder.

3. A method for producing an oil holding cylinder for an oil coating roller, comprising the following steps of:

kneading a mixture of 100 parts by weight composed of ceramic fiber of 45 to 60 wt %, clay of 10 to 30 wt %, inorganic binder 7 to 10 wt % and organic binder 18 to 24 wt % with water of 20 to 100 parts by weight to form a plastic mixture;

extruding the plastic mixture into a cylinder; and after said extruding, drying said cylinder.

* * * * *